United States Patent [19]

Kunda et al.

[11] 3,975,217

[45] Aug. 17, 1976

[54] FINELY DIVIDED MAGNETIC COBALT POWDER

[75] Inventors: Wasyl Kunda, Edmonton, Canada; Winfried J. Huppmann, Stuttgart, Germany

[73] Assignee: Sherritt Gordon Mines Limited, Toronto, Canada

[22] Filed: Dec. 6, 1974

[21] Appl. No.: 530,111

Related U.S. Application Data

[62] Division of Ser. No. 456,482, March 29, 1974.

[52] U.S. Cl. ............................. 148/105; 75/.5 AA; 75/119
[51] Int. Cl.² ........................................... H01F 1/02
[58] Field of Search.......... 148/105; 75/.5 AA, .5 A, 75/.5 BA, .5 BB, .5 B, 119, 108

[56] References Cited
UNITED STATES PATENTS

| | | | |
|---|---|---|---|
| 2,734,821 | 2/1956 | Schaufelberger | 75/108 |
| 2,744,003 | 3/1956 | Schaufelberger et al. | 75/.5 AA |
| 3,305,349 | 2/1967 | Bovarnick et al. | 75/.5 AA |
| 3,337,327 | 8/1967 | Jordan et al. | 75/.5 AA |
| 3,373,012 | 3/1968 | Hardy et al. | 75/.5 AA |
| 3,393,067 | 7/1968 | Alexander et al. | 75/.5 AA |
| 3,399,050 | 8/1968 | Evans et al. | 75/.5 AA |
| 3,526,498 | 9/1970 | Evans et al. | 75/.5 AA |
| 3,567,525 | 3/1971 | Graham et al. | 148/105 |
| 3,669,643 | 6/1972 | Bagley et al. | 148/105 |

*Primary Examiner*—Walter R. Satterfield
*Attorney, Agent, or Firm*—Frank I. Piper; Arne I. Fors; Robert F. Delbridge

[57] ABSTRACT

A cobalt powder product is described which is composed of cobalt particles about 0.8 microns or smaller in size and have refractory oxide particles fixed on the surfaces thereof. The powder is particularly suitable for manufacture of sintered carbide products as well as for use in magnetic products such as magnetic inks and tapes.

4 Claims, No Drawings

FINELY DIVIDED MAGNETIC COBALT POWDER

This application is a division of application Ser. No. 456,482, filed Mar. 29, 1974.

This invention relates to the production of finely divided metal powders and, more particularly, to a process for the production of finely divided cobalt powders. The invention is also concerned, in its more specific aspects, with certain ultra fine magnetic cobalt powder products obtainable by the process.

There are various uses in industry for very finely divided cobalt powders including, for example, production of sintered carbide products, such as metal stamping and cutting tools. Certain kinds of fine cobalt powder also find application in the manufacture of devices incorporating fine particles of magnetic materials such as magnetic tapes and ink and permanent magnets to mention only a few. The basic requirements for cobalt powder for use in sintered carbides production are fine particle size, i.e. less than 2 microns and preferably about 1 micron, and high purity. Oxygen content must be less than 1 wt. %, preferably about 0.5 wt. % or less, and carbon content must be less than 0.2 wt. %. The physical requirements for magnetic cobalt powders are similar except that smaller particle size, e.g. about 0.8 micron or less is preferred, and oxygen content may be slightly higher, e.g. up to about 2 wt. %.

Numerous processes are known for producing fine cobalt and cobalt alloy powders. It is known, for example, to produce fine cobalt powders by decomposition of cobalt oxylate in a reducing atmosphere. It is also known, as described in U.S. Pat. Nos. 2,734,821, 2,744,003 and 2,805,149 to produce cobalt powders by direct reduction from aqueous solutions and slurries at elevated temperature and pressure. While these and other similar direct reduction processes permit practical and economic production of a variety of cobalt powders, difficulties are encountered in adapting these processes for the production of ultra fine cobalt powders having a particle size of 1 micron and smaller. Also, contamination of the product by impurities, particularly carbon and oxygen, is a problem with these prior processes. Other direct reduction processes, such as those described in U.S. Pat. Nos. 3,494,760 and 3,669,643, for example, have been proposed for making very fine cobalt powders adapted particularly for magnetic applications. However, these processes lack the flexibility required to produce fine cobalt powders for other applications. In addition, they are technically difficult and expensive to carry out on a commercial scale with the result that the products are generally too expensive for wide scale industrial use.

The present invention provides a surprisingly simple, economic and flexible process for producing a variety of fine and ultra fine cobalt powders. (In general, in this description, the expression "fine" as applied to particle size is intended to mean particles in the 1 to 2 micron size range. "Ultra fine" is intended to mean particles about 1 micron and smaller in size). The process is equally adaptable for producing fine cobalt powders for use in the sintered carbides field or ultra fine powders particularly adapted for magnetic applications as well as for other powder metallurgy applications where small particle size is a necessary requirement of the powder.

According to the present invention, fine and ultra fine cobalt powders are produced by a process involving two basic operations. Firstly, finely divided cobaltous carbonate is prepared by precipitation from a cobaltous ammine-ammonium sulphate solution by reacting the solution with carbon dioxide under conditions which are specifically controlled to control the particle size of the cobaltous carbonate precipitate. Secondly, the cobalt carbonate precipitate is separated from the solution and is dry-reduced with hydrogen under controlled conditions of time and temperature to produce finely divided elemental cobalt powder.

More specifically, the process of the invention includes the steps of providing an aqueous cobaltous ammine-ammonium sulphate solution having a free ammonia to cobalt molar ratio of at least about 2.0; heating said solution in a closed reaction vessel to a temperature within the range of about 50°C. to about 120°C.; actively agitating said heated solution and reacting it with carbon dioxide under a partial pressure of carbon dioxide within the range of from about 20 p.s.i. to about 300 p.s.i. to precipitate cobalt from the solution in finely divided cobaltous carbonate form; separating said cobaltous carbonate precipitate from the solution; heating the cobaltous carbonate precipitate under a hydrogen atmosphere at a temperature in the range of about 400°C. to about 700°C. for a time sufficient to reduce said precipitate to metallic cobalt powders containing less than about 2% oxygen and cooling the metallic cobalt powder under non-oxidizing conditions before exposing it to the atmosphere.

According to one particularly useful modification of the foregoing basic process, ultra fine cobalt particles, about 1 micron in size and smaller, having desirable magnetic properties, are produced by depositing a small quantity of a refractory oxide forming compound, such as magnesium hydroxide or yttrium hydroxide, on the particles of cobaltous carbonate precipitate prior to the reduction with hydrogen. During the reduction step, this compound functions to prevent migration of cobalt atoms during heating thus inhibiting the growth of the cobalt particles. Upon exposure to air after cooling, the refractory metal compound is converted to sub-micron refractory oxide particles. These particles, which are substantially inert and present only in a very small amount, do not adversely affect the magnetic properties of the powder in any way while they serve to stabilize the very fine cobalt particles by greatly inhibiting their pyrophoricity. A powder product obtainably by this procedure consists of non-pyrophoric magnetic particles of cobalt of a size predominantly no larger than about 1 micron and preferably no larger than a single magnetic domain (0.8 micron). The cobalt particles have a minor amount of refractory oxide particles fixed in the surfaces thereof which serve to stabilize the powder, permitting handling and substantially preventing spontaneous oxidation of the particles on exposure to air such that the oxygen content of the powder (excluding that associated with the refractory oxide particles) remains substantially unchanged.

A further preferred modification of the process contemplates the grinding of the $CoCO_3$ precipitate, such as by wet ball milling, prior to the reduction step as a means of further decreasing the particle size of the precipitate.

In carrying out the process of the invention, the first requirement is the provision of an aqueous cobaltous ammine-ammonium sulphate solution. Such solution may already be available in commercial cobalt production plants which utilize hydrometallurgical cobalt recovery processes such as that described in U.S. Pat. No. 2,767,054, for example. Such solution may also be made up by dissolving cobaltous ammonium sulphate salt or metallic cobalt in ammonia-ammonium sulphate solution, or by dissolving cobalt oxide or metallic cobalt in $H_2SO_4$. Regardless of the source or manner of preparation of the cobaltous ammine-ammonium sulphate feed solution, it is essential to the operation of the process that the cobalt in the feed solution be in the cobaltous form. Any cobaltic cobalt in the feed solution will not be precipitated in the subsequent steps of the process so that the yield of precipitate will decrease in direct proportion to the amount of cobalt present in the cobaltic form. The specific quantity of cobalt in the solution is not critical to the operation of the process. In general, the process is operable with any amount of cobalt up to its limit of solubility in the solution. However, for practical economic and operating reasons, a cobalt concentration of about 40–70 g.p.l. is preferred. A concentration of 40–45 g.p.l. is most preferred in that with concentrations above about 45 g.p.l., the ammonium sulphate concentration must be very high, e.g. 500 g.p.l. or more to keep the cobalt in solution and such high $(NH_4)_2SO_4$ concentrations tend to increase the amount of sulphur contamination in the precipitate.

In the precipitation step, the cobaltous ammine-ammonium sulphate solution is reacted in an agitator equipped pressure vessel with carbon dioxide at a temperature within the range of about 50°C, to about 120°C, preferably about 75°–100°C., under a carbon dioxide partial pressure within the range of about 20 p.s.i. to about 300 p.s.i., preferably about 50–100 p.s.i., to form and precipitate cobaltous carbonate. The upper carbon dioxide partial pressure limit is not critical to the operation of the process but is determined by equipment considerations. The upper and lower temperature limits and the lower $CO_2$ partial pressure limit define the range within which a reasonable yield of precipitate is obtained from the reaction. The yield, i.e. percent of total dissolved cobalt precipitated from the feed solution, and the particle size of the $CoCO_3$ precipitate are functions of the feed solution composition and other process variables, including mainly temperature, $CO_2$ partial pressure, reaction time and degree of agitation. Because of the large number of variables and the apparent interdependence of these variables, it is not possible to isolate the effect of each variable. However, it has been found that through appropriate control and correlation of the principal variables, both high yield and close control over the particle size of the cobaltous carbonate precipitate can be obtained. Since the fineness of the cobalt powder product is directly related to the fineness of the cobaltous carbonate precipitate, this control of precipitate particle size permits control of the particle size of the cobalt powder product. In general, a wide range of free ammonia ($NH_{3F}$) to cobalt molar ratios may be used in the feed solution for the $CoCO_3$ precipitation step with little or no adverse affect on the yield or physical properties of the precipitate provided other conditions are appropriately adjusted. ("Free ammonia" means ammonia in the system which is titratable with $H_2SO_4$). More specifically, with any $NH_{3F}/Co$ molar ratio above about 2, at least a 60% yield of $CoCO_3$ precipitate having a Fisher number below about 1.0 is obtained with any $CO_2$ partial pressure and temperature within the aforementioned general ranges. ("Fisher number" as used herein is the value obtained for average particle size by the Fisher sub-sieve sizer following the procedures based on ASTM Standard 13330-58T). For optimum yield, $NH_{3F}/Co$ molar ratio should be in the range of 2–4.5. $NH_{3F}/Co$ molar ratios at the higher end of this range are preferable in that less impurities, particularly sulphur, precipitates with the $CoCO_3$ at these conditions. There is no upper limit on the $NH_{3F}/Co$ molar ratio insofar as operability of the process is concerned, but from a practical point of view, there is really no purpose in going beyond a $NH_{3F}/Co$ molar ratio of about 6 since there is no beneficial effect obtained with such higher ratios.

With nominal $NH_{3F}/Co$ molar ratio of 4.5, temperature of 90°C., and $CO_2$ pressure of 100 p.s.i., precipitation of $CoCO_3$ is completed in about 30 minutes. Lower $NH_{3F}/Co$ molar ratios and higher $CO_2$ pressures result in an increase in the precipitation time. Conditions resulting in a short precipitation time are preferred because the Fisher number of the carbonate increases with increasing time.

With increasing temperature, the yield of $CoCO_3$ precipitate decreases quite rapidly and the physical properties of the precipitate become unfavourable for the production of ultra fine cobalt powder.

Lower $NH_{3F}/Co$ molar ratios in the head solution yield higher cobalt recoveries at low $(NH_4)_2SO_4$ concentrations. The Fisher number of the cobaltous carbonate tends to decrease with an increase in ammonium sulphate concentration. At a nominal $NH_{3F}/Co$ molar ratio of 4.2, the optimum $(NH_4)_2SO_4$ concentration for a high yield of $CoCO_3$ is 250–300 g.p.l.

It is essential that the system be actively agitated in order for precipitation to occur. The more violent agitation of a marine type impeller increases the yield and also decreases the Fisher nunber of the $CoCO_3$ precipitates as compared to the less violent agitation of a paddle type impeller.

Upon completion of the $CoCO_3$ precipitation reaction the precipitate is separated from the precipitation-end solution. In order to remove ammonium sulphate, and hence sulphur that crystallizes on the cobalt carbonate precipitate when discharging the reaction vessel, it is preferred to wash the precipitate with fresh water. If the precipitate is not washed, sulphur in the crystallized ammonium sulphate may report as an impurity in the cobalt powder after solid state reduction.

The washed $CoCO_3$ precipitate may next be passed directly to the reduction operation which is described in greater detail hereinbelow or it may be slurried with water and wet ball milled for a period of time, e.g. 3–6 hours, to further decrease the size of the precipitate particles. In general, such ball milling will only be required if, for some reason, the desired degree of fineness cannot be obtained through control of precipitation conditions alone.

According to a preferred modification of the invention, the $CoCO_3$ precipitate may, prior to the reduction operation, be treated in an additional step or steps to deposit on the precipitate particles a refractory oxide forming metal compound which functions to prevent sintering and growth of particle size in the reduction operation. This modification of the process permits the production of ultra fine cobalt powders which are stable under atmospheric conditions and which have particularly useful magnetic properties.

A preferred procedure for deposition of the refractory metal oxide forming compound is to first disperse the $CoCO_3$ from the precipitation step in water containing ions of a refractory oxide forming metal such as Mg, Ca, Ba, Al, Be, Ce, Hf, La, Th, Y and Zr.

Ions of the refractory oxide-forming metal or metals may be introduced into the suspending medium in a number of ways. A soluble salt, such as magnesium, calcium or barium sulphate or yttrium or thorium nitrate may be dissolved in an aqueous solution and the solution added to the $CoCO_3$ slurry. The pH of the slurry is then adjusted by the addition of a base to cause the refractory metal to precipitate onto the suspended $CoCO_3$ particles. Preferably, the pH is adjusted to about 8.5–9.5 by addition of ammonia. To hasten the reaction, the slurry may be agitated and with agitation the reaction is usually complete in less than 15 minutes.

Although the exact mechanism of the refractory metal compound precipitation reaction is not known, it is believed that the magnesium, yttrium or other refractory oxide forming metal precipitates in the form of a hydroxide and deposits on and becomes fixed to the $CoCO_3$ particles suspended in the slurry.

The concentration of refractory oxide-forming metal ions in the solution is governed by the amount of refractory oxide-forming compound (sometimes hereinafter abbreviated as ROF) which is desired on the $CoCO_3$ particles. The concentration of any given refractory oxide-forming metal which will deposit the desired amount of ROF compound can be calculated having regard to the $CoCO_3$ content of the slurry. In general, the precise amount of deposited ROF compound is not of particular importance to the overall operativeness of the process. However, since the quantity of deposited ROF compound has a pronounced affect on the particle size of the cobalt powder product, the quantity must be selected having regard to particle size that is desired. For practical reasons, it is desirable to deposit the minimum amount of ROF compound that will be effective to give the degree of particle size control that is desired. This amount can be readily determined in each specific case by a few routine experimental tests. In most cases, the desired effect will be obtained in an amount of refractory oxide forming metal compound sufficient to provide from about 0.1 to about 6 wt. % of the corresponding refractory oxide in the final cobalt powder product. Within this range of ROF compound addition, the fineness of the final product increases with increase of refractory oxide content. However, since the preferred cobalt powder particle size for a particular magnetic application may not necessarily be the absolute minimum that is obtainable by the process, the optimum refractory oxide content may vary for each case depending on the circumstances applicable.

When the reaction between the refractory oxide forming metal and the $CoCO_3$ particles is complete, the slurry may be passed to a liquids-solids separation step for the recovery of the $CoCO_3$ precipitate or, optionally, before separation of the $CoCO_3$ the slurry may be treated in a grinding or ball milling operation to further decrease the particle size of the $CoCO_3$-ROF compound precipitate. Such grinding step may be utilized in any case where it is desired to further decrease the particle size of the $CoCO_3$ precipitate. In most cases where further grinding is used, about 4–6 hours of wet ball milling will be sufficient to lower the Fisher number of a relatively coarse $CoCO_3$ precipitate to below about 1.

The $CoCO_3$ precipitates, either with or without the deposited refractory oxide forming compound, depending on which process route is taken, is next heated at an elevated temperature in a hydrogen atmosphere to convert the $CoCO_3$ to pure elemental cobalt powder. The reduction reaction can be carried out in any suitable kiln or furnace in which the temperature and atmosphere can be controlled to provide the conditions necessary for reduction of the $CoCO_3$ to elemental cobalt powder. For this purpose, it is essential to maintain the temperature of the $CoCO_3$ within the range of about 400°C. to about 700°C. with the precise temperature depending on the quantity of refractory oxide forming compound associated with the $CoCO_3$ and the degree of fineness desired for the final product. Where the $CoCO_3$ contains no refractory oxide forming compound, the reducing temperature preferably should be maintained between about 400°–600°C. and, if maximum fineness is desired, at about 550°C. With higher amounts of refractory oxide forming compound somewhat higher temperatures, e.g. up to 650°C., can be utilized without adversely affecting the particle size of the final product.

The precise time required for the complete reduction of the $CoCO_3$ will depend on the temperature. In any case, the reduction step must be continued for a sufficient time to lower the residual oxygen content (exclusive of oxygen associated with the refractory oxide forming compound) to less than about 2.0% and if required by product specification, to less than 0.6% by wt. %. In most cases, 3–6 hours is sufficient time for the reduction step. The higher the refractory oxide forming compound content of the $CoCO_3$, the higher the reduction temperatures and the shorter the reduction times that can be employed.

The hot reduced cobalt particles oxidize extremely rapidly on exposure to air. To avoid spontaneous combustion of the particles, they must be cooled in a non-oxidizing atmosphere, such as nitrogen, before exposure to the atmosphere. The degree of cooling required before exposure to the atmosphere depends on the presence or absence of the refractory oxide forming compound. In the case of Co powder containing no refractory oxide forming compound, the cobalt powder must be cooled at least to room temperature before exposure to air. Preferably such powders are cooled to 5°–10°C. below room temperature before exposure to air. Upon exposure to the air, such particles are stable and non-pyrophoric. In the case of Co particles having the refractory oxide forming deposit thereon, it is desirable but not essential to cool the particles under non-oxidizing conditions to room temperature before exposure to air. However, in most cases, cooling to within about 100°C. of room temperature is sufficient. Upon contacting the air, the deposited compound of the refractory oxide forming metal decomposes to a refractory oxide which remains fixed on the surfaces of the cobalt powder as sub-micron sized particles. This refractory oxide serves to stabilize the cobalt powder product, preventing incipient spontaneous oxidation of the powder during handling, storage and use.

The preferred product powders obtained by this modification of the process are composed of extremely fine, magnetic cobalt particles having sub-micron sized refractory oxide particles fixed on the surfaces thereof and containing less than 2% oxygen (exclusive of the oxygen associated with the refractory oxide) and having a particle size no larger than a single magnetic domain, i.e. no larger than 0.8 micron. These powders have a coercivity of 200–400 oersteds and a remanent induction value of 2000–7000 gauss, making them suitable for magnetic applications wherein this combination of relatively high coercivity and remanence are desired.

The process of the invention and the properties of some of the preferred products are further illustrated and described in the following examples.

EXAMPLE I

This example illustrates the affect of various process variables on the particle size of the $CoCO_3$ produced in the precipitation step of the process.

The feed solution for the tests was prepared by dissolving cobaltous ammonium sulphate salt in aqueous ammonia-ammonium sulphate solution. After appropriate adjustment of the composition, 2 liter samples of solution were charged into a one gallon high pressure laboratory autoclave, heated to operating temperature and reacted with $CO_2$ under pressure. After completion of each test run, the $CoCO_3$ precipitate was separated from the remaining solution by filtration and subjected to washing in order to remove sulphur contamination.

The results of these tests are shown in the following Table 1.

TABLE 1

Chemical and Physical Analyses of Cobalt Carbonate Precipitated from Cobaltous Ammine Ammonium Sulphate Solution with Carbon Dioxide
Conditions: Unless varied, Temp. - 93°C., $CO_2$ - 100 psi, Time - 60 minutes, Agitation at 800 rpm- Marine type impel

| Exp. No. | Variable Conditions | | Feed Solution (2.0 l charge) Analysis (gpl) | | | | | |
|---|---|---|---|---|---|---|---|---|
| | | | $Co^{++}$ | $NH_{3F}$ | S | $(NH_4)_2SO_4$ | $NH_{3F}/Co$ M.R. | Barren Soln gpl Co |
| | $Co_T$ | $Co^{+++}$ in soln (%) | | | | | | |
| 1 | 66.8 | 8.4 | 61.2 | 50.0 | | 536 | 2.61 | 3.2 |
| 2 | 56.4 | 46.6 | 30.6 | 25.0 | | 548 | 1.54 | 24.5 |
| 3 | 46.0 | 100 | 0 | 0 | | 558 | 0 | 40.2 |
| | Temp (°C) | | | | | | | |
| 1 | 66° | | 40.6 | 52.0 | 84.8 | 259 | 4.5 | 1.2 |
| 2 | 93° | | 41.3 | 52.0 | 85.8 | 261 | 4.4 | 3.7 |
| 3 | 120° | | 42.4 | 52.0 | 83.4 | 249 | 4.3 | 17.6 |
| | $CO_2$ Pressure (psi) | | | | | | | |
| 1 | 50 | | 41.7 | 52.0 | 82.4 | 246 | 4.3 | 1.9 |
| 2 | 100 | | 41.3 | 52.0 | 85.8 | 261 | 4.4 | 2.5 |
| 3 | 200 | | 39.5 | 52.0 | 72.4 | 210 | 4.5 | 8.8 |
| | $NH_{3F}/Co$ Molar Ratio | | | | | | | |
| 1 | 2.7 | | 44.4 | 35.0 | 83.2 | 243 | 2.7 | 0.3 |
| 2 | 4.1 | | 44.3 | 52.0 | 84.2 | 248 | 4.1 | 0.3 |
| 3 | 5.2 | | 44.8 | 69.0 | 85.8 | 253 | 5.2 | 6.1 |
| | Time (Mins) | | | | | | | |
| 1 | 30 | | 37.0 | 52.0 | 71.0 | 247 | 4.8 | 2.8 |
| 2 | 60 | | 41.3 | 52.0 | 85.8 | 261 | 4.4 | 3.7 |
| 3 | 120 | | 41.0 | 52.0 | 81.4 | 244 | 4.4 | 3.1 |
| | $(NH_4)_2SO_4$ Conc. (gpl) | | | | | | | |
| 1 | 146 | | 42.0 | 52.0 | 58.2 | 146 | 4.3 | 10.2 |
| 2 | 253 | | 41.3 | 52.0 | 85.8 | 253 | 4.4 | 3.7 |
| 3 | 325 | | 48.5 | 52.0 | 105.2 | 325 | 3.8 | 5.5 |
| | Dilution (%) | | | | | | | |
| 1 | 62 | | 18.2 | 21.0 | 35.5 | 107 | 4.0 | 0.7 |
| 2 | 36 | | 33.1 | 42.0 | 63.4 | 187 | 4.4 | 2.0 |
| 3 | 0 | | 47.1 | 63.0 | 93.0 | 278 | 4.8 | 3.1 |
| | Agitation | | | | | | | |
| 1 | None | | 44.3 | 52.0 | 84.2 | 248 | 4.1 | 48.2 |
| 2 | Marine type impeller | | 44.3 | 52.0 | 84.2 | 248 | 4.1 | 0.3 |
| 3 | Paddle type impeller | | 41.3 | 52.0 | 85.8 | 262 | 4.4 | 3.7 |

| Exp. No. | Variable Conditions | | Cobalt Carbonate Precipitate | | | | | Physical Properties | | Percent Cobalt as Precipitate |
|---|---|---|---|---|---|---|---|---|---|---|
| | | | Wt. gms. | Chemical Analysis (%) Co | $CO_2$ | S | $CO_2/Co$ M.R. | A.D. | S.A. | F.N. | |
| | $Co_T$ | $Co^{+++}$ in soln (%) | | | | | | | | | |
| 1 | 66.8 | 8.4 | 330.5 | 45.9 | 32.7 | 0.21 | 0.96 | | | | 91.8 |
| 2 | 56.4 | 46.6 | 128.0 | 44.2 | 30.8 | 1.01 | 0.93 | | | | 43.5 |
| 3 | 46.0 | 100 | None | | | | | | | | 0 |
| | Temp (°C) | | | | | | | | | | |
| 1 | 66° | | 159 | 50.0 | 34.0 | 0.10 | 0.91 | 0.60 | 61.5 | 0.70 | 99.2 |
| 2 | 93° | | 147 | 48.0 | 35.0 | 0.06 | 0.98 | 1.32 | 12.3 | 2.95 | 85.4 |
| 3 | 120° | | 62 | 47.0 | 34.0 | 0.02 | 0.97 | 1.61 | 0.1 | 4.90 | 34.4 |

TABLE 1-continued

Chemical and Physical Analyses of Cobalt Carbonate Precipitated from Cobaltous Ammine Ammonium Sulphate Solution with Carbon Dioxide
Conditions: Unless varied, Temp. - 93°C., CO₂ - 100 psi, Time - 60 minutes, Agitation at 800 rpm- Marine type impel

|   | CO₂ Pressure (psi) |   |   |   |   |   |   |   |   |   |
|---|---|---|---|---|---|---|---|---|---|---|
| 1 | 50  | 163 | 48.8 |      | 0.05  |      | 0.57 | 63.4 | 0.54 | 95.5 |
| 2 | 100 | 141 | 48.0 | 35.0 | 0.06  | 0.98 | 0.71 | 59.2 | 1.20 | 82.0 |
| 3 | 200 | 102 | 47.1 |      | 0.05  |      | 0.81 | 54.7 | 2.20 | 80.8 |
|   | NH₃F/Co Molar Ratio |   |   |   |   |   |   |   |   |   |
| 1 | 2.7 | 179 | 46.9 | 33.3 | 0.17  | 0.95 | 0.49 | 10.6 | 0.21 | 94.3 |
| 2 | 4.1 | 176 | 46.5 | 33.9 | 0.013 | 0.98 | 0.67 | 45.5 | 1.00 | 92.3 |
| 3 | 5.2 | 108 | 49.5 | 31.6 | 0.17  | 0.86 | 0.66 | 12.9 | 0.42 | 59.5 |
|   | Time (Mins) |   |   |   |   |   |   |   |   |   |
| 1 | 30  | 153 | 48.3 |      | 0.036 |      | 0.88 | 8.0  | 2.70 | 92.4 |
| 2 | 60  | 147 | 47.7 | 34.9 | 0.062 | 0.98 | 1.32 | 12.3 | 2.95 | 91.0 |
| 3 | 120 | 149 | 48.4 | 35.1 | 0.036 | 0.97 | 1.28 | 13.3 | 3.40 | 92.4 |
|   | (NH₄)₂SO₄ Conc. (gpl) |   |   |   |   |   |   |   |   |   |
| 1 | 146 | 130 | 47.6 | 34.3 | 0.065 | 0.97 | 1.18 | 22.1 | 3.30 | 73.4 |
| 2 | 253 | 147 | 47.7 | 34.9 | 0.062 | 0.98 | 1.32 | 12.3 | 2.95 | 84.0 |
| 3 | 325 | 151 | 46.4 |      | 0.068 |      | 1.61 | 1.0  | 1.80 | 72.3 |
|   | Dilution (%) |   |   |   |   |   |   |   |   |   |
| 1 | 62  | 61  | 46.2 | 34.1 | 0.03  | 0.99 | 0.44 | 10.1 | 0.35 | 77.4 |
| 2 | 36  | 135 | 46.0 |      | 0.017 |      | 0.59 | 69.8 | 0.48 | 93.8 |
| 3 | 0   | 195 | 47.1 |      | 0.034 |      | 1.18 | 34.7 | 1.78 | 97.8 |
|   | Agitation |   |   |   |   |   |   |   |   |   |
| 1 | None | None |   |   |   |   |   |   |   | 0    |
| 2 | Marine type impeller | 175 | 46.5 | 33.9 | 0.013 | 0.98 | 0.67 | 45.5 | 1.0 | 94.5 |
| 3 | Paddle type impeller | 147 | 47.7 | 34.9 | 0.062 | 0.98 | 1.32 | 12.3 | 2.95 | 84.7 |

M.R. - Molar ratio
A.D. - Apparent Density - gram/cc
S.A. - Surface Area - m²/gram
F.N. - Fisher Number - average micron size
Co_T - Total cobalt g.p.l.
NH₃F - Ammonia titratable with H₂SO₄

EXAMPLE II

This example illustrates the affect of temperature and time in the reduction of fine $CoCO_3$ with hydrogen. A sample of fine $CoCO_3$ was prepared by reacting cobaltous ammine-ammonium sulphate solution with $CO_2$ at a temperature of 82°C. and under a partial pressure of $CO_2$ of 80 p.s.i. The properties of the $CoCO_3$ recovered from the precipitation end solution are shown in the following Table II.

TABLE II

| Sample No. | Chemical Analysis | | | Physical Properties | | |
|---|---|---|---|---|---|---|
|  | Co | CO₂ | S | A.D. g/cc | Fisher No | S.A. m²/g |
| 1 | 48.0 | 32.8 | 0.16 | 0.46 | 1.28 | 158.0 |

Samples of the $CoCO_3$ were reduced to elemental form in an electrically heated 6 inches diameter tube furnace. The charges were placed in a stainless steel boat in the furnace. Initially, nitrogen gas was fed through the furnace and after reaction temperature was attained, nitrogen was replaced by hydrogen which was flowed through the furnace at 2 l/min. On completion of the reduction, the whole furnace was cooled to room temperature, the $H_2$ was replaced by nitrogen for 30 minutes when the front end of the furnace was opened and the samples transferred directly into a nitrogen-filled plastic bag. The products were cooled to about 10°C. after which they could be exposed to the atmosphere and handled. Some of the powder taken from the furnace at room temperature and exposed to the atmosphere were pyrophoric. The affects of temperature and time on the powder product properties are shown in Table III.

TABLE III

| Investigated Variable | Conditions | | Analyses (%) | | A.D. | F.N. | S.A. | Buckbee-Mears Screen(%) | | | | | |
|---|---|---|---|---|---|---|---|---|---|---|---|---|---|
|  | Time hr. | Temp. °C | O₂ | C | g/cc |  | m²/g | +44 μ | 44/30 μ | 30/20 μ | 20/10 μ | 10/5 μ | −5 μ |
| Temperature | 4 | 315 | 4.40 | n.a. | 0.61 | 0.62 | 13.0 | 0 | 0 | 1 | 1 | 36 | 62 |
|  | 4 | 427 | 2.60 | n.a. | 0.55 | 0.73 | 4.6 | 2 | 2 | 0 | 2 | 44 | 50 |
|  | 4 | 538 | 1.45 | n.a. | 0.61 | 0.95 | 3.0 | 4 | 2 | 4 | 10 | 48 | 32 |
|  | 4 | 593 | 0.95 | 0.16 | 0.49 | 1.02 | 1.9 | 6 | 4 | 6 | 12 | 40 | 32 |
|  | 4 | 649 | 0.56 | n.a. | 0.62 | 1.35 | 1.6 | 20 | 6 | 12 | 6 | 32 | 14 |
|  | 4 | 649 | 0.97 | 0.15 | 0.59 | 1.27 | 1.1 | 12 | 2 | 4 | 18 | 40 | 24 |
|  | 4 | 700 | 0.75 | 0.15 | 0.67 | 1.50 | 1.1 | 20 | 4 | 8 | 22 | 20 | 26 |
| Retention Time | 2 | 593 | 1.29 | 0.14 | 0.56 | n.r. | 2.8 | 4 | 6 | 6 | 10 | 44 | 30 |
|  | 4 | 593 | 1.14 | 0.14 | 0.57 | 0.98 | 2.2 | 6 | 4 | 6 | 8 | 48 | 28 |
|  | 16 | 593 | 0.87 | 0.19 | 0.51 | 1.00 | 2.2 | 4 | 2 | 2 | 8 | 64 | 20 |

TABLE III-continued

| Investigated Variable | Conditions Time hr. | Temp. °C | Analyses (%) $O_2$ | C | A.D. g/cc | F.N. | S.A. $m^2/g$ | +44 $\mu$ | Buckbee-Mears Screen(%) 44/30 $\mu$ | 30/20 $\mu$ | 20/10 $\mu$ | 10/5 $\mu$ | −5 $\mu$ |
|---|---|---|---|---|---|---|---|---|---|---|---|---|---|
| | 24 | 593 | 0.90 | 0.20 | 0.52 | 1.03 | 2.1 | 6 | 4 | 4 | 4 | 50 | 32 |

EXAMPLE III

This example illustrates the preparation of ultra fine magnetic cobalt powder containing a small amount of refractory oxide forming compound.

Cobaltous carbonate was precipitated from cobaltous ammine sulphate solution as described in Example II. The precipitate had the following chemical analysis (by weight %): Co = 48.0; $CO_2$ = 32.8; S = 0.15 and the following physical properties: A.D. (apparent density) = 0.45; Fisher Number = 1.2; Buckbee-Mears Screen (%) — 10/20 $\mu$ = 26; 10/5$\mu$ = 70; −5$\mu$ = 4.

The cobalt carbonate was separated from the liquid and was divided into a number of samples. Each sample was dispersed in 220 ml water and to each was added a calculated quantity of a yttrium nitrate solution to produce slurry samples containing the equivalent of from 0 to 0.33 moles yttria per 100 g. cobalt. The yttrium nitrate solution was prepared by dissolving commercially available yttrium in nitric acid at a temperature of 95°C. The composition of the solution was 2 moles per liter $Y^{++++}$ and 6 moles per liter $NO_3^-$.

Sufficient ammonia was added to each slurry sample to increase the pH to 9 to cause $Y(OH)_4$ to precipitate. The total charge in each case was placed in a ceramic ball mill and ground for 4 hours. The ground material was filtered on a Buchner filter. The wet residue was placed in a boat in a 6 inches tube furnace and heated at 590°C. for 4 hours while one liter/min $H_2$ was flowed through the furnace. On completion of the reduction, the product was cooled in the furnace in hydrogen gas to about 20°C. then hydrogen was replaced by nitrogen for 30 minutes and the cobalt powder was transferred into a plastic bag, avoiding exposure to the air. The powder was then cooled further to about 10°C. and then brought to room temperature.

The chemical, physical and magnetic properties of the finished particles are set out in the following Table IV.

TABLE IV

| Wt g | Chemical Analysis (%) Co | $O_2^{(1)}$ | $Y_2O_3$ | Physical Properties A.D. | F.N. | S.A.(2) | +44 $\mu$ | 44/30 $\mu$ | 30/20 $\mu$ | 20/10 $\mu$ | 10/5 $\mu$ | −5 $\mu$ | Magnetic Properties Hc | Br |
|---|---|---|---|---|---|---|---|---|---|---|---|---|---|---|
| 600 | 97.4 | 1.4 | 0.45 | 0.53 | 0.58 | 2.8 | 8 | 2 | 6 | 10 | 32 | 42 | 230 | 5000 |
| 600 | 96.2 | 1.3 | 1.75 | 0.58 | 0.31 | 3.9 | 1 | 3 | 3 | 1 | 24 | 68 | 230 | 5500 |
| 600 | 92.6 | 2.2 | 3.72 | 0.52 | 0.10 | 7.1 | — | tr | 1 | 1 | 1 | 97 | 270 | 4700 |
| 628 | 92.9 | 1.2 | 4.2 | 0.92 | 0.65 | 6.7 | 0 | 0 | 2 | 2 | 20 | 76 | 230 | 4500 |

Hc = intrinsic coercive force (oersteds)
Br = residual magnetization (gauss)
(1) = oxygen bound with Co
(2) = surface area m²/gm

EXAMPLE IV

A sample of cobalt powder was prepared in the same way as that described in Example 4 except that thorium nitrate was used in place of yttrium nitrate. The properties of the powder product were: Thoria content — 2.7 wt. %, Fisher number — 0.64, coercivity — 200 oersteds, residual magnetization value — 2550 gauss.

What we claim as new and desire to protect by Letters Patent of the United States is:

1. Non-pyrophoric magnetic cobalt particles of a size no larger than about 0.8 micron, said particles having sub-micron sized refractory oxide particles fixed on the surfaces thereof and containing less than 0.2 wt. % carbon and less than 2 wt % oxygen exclusive of the oxygen associated with said refractory oxide, said cobalt particles being further characterized by a coercivity of 200 to 400 oersteds and a remanent induction value of 2000–7000 gauss.

2. Magnetic cobalt particles according to claim 1 having the refractory oxide particles formed of an oxide of at least one of the metals of the group consisting of Mg, Ca, Ba, Al, Be, Ce, Hf, La, Th, Y and Zr.

3. Magnetic cobalt particles according to claim 2 containing from about 0.1 to about 6 wt % refractory oxide.

4. Magnetic cobalt particles according to claim 3 having the refractory oxide particles formed of yttria, magnesia or thoria.

* * * * *